United States Patent
Kiryati et al.

(10) Patent No.: US 8,724,891 B2
(45) Date of Patent: May 13, 2014

(54) APPARATUS AND METHODS FOR THE DETECTION OF ABNORMAL MOTION IN A VIDEO STREAM

(75) Inventors: Nahum Kiryati, Tel Aviv (IL); Tamar Riklin-Raviv, Givatayim (IL); Yan Ivanchenko, Nes Ziona (IL); Shay Rochel, Kiryat Tivon (IL); Igal Dvir, Ra'anana (IL); Daniel Harari, Rehovot (IL)

(73) Assignees: Ramot at Tel-Aviv University Ltd., Tel Aviv (IL); Nice Systems Ltd., Ra'anana (IL)

( * ) Notice: Subject to any disclaimer, the term of this patent is extended or adjusted under 35 U.S.C. 154(b) by 3300 days.

(21) Appl. No.: 10/930,254

(22) Filed: Aug. 31, 2004

(65) Prior Publication Data

US 2006/0045185 A1     Mar. 2, 2006

(51) Int. Cl.
| G06K 9/66 | (2006.01) |
| H04N 7/18 | (2006.01) |
| H04N 7/36 | (2006.01) |
| G06F 17/18 | (2006.01) |
| G06K 9/64 | (2006.01) |
| G06K 9/68 | (2006.01) |

(52) U.S. Cl.
USPC ........... 382/160; 348/143; 348/152; 348/153; 348/154; 348/155; 375/240.16; 382/155

(58) Field of Classification Search
USPC ............... 348/152–155; 382/155; 375/240.16
See application file for complete search history.

(56) References Cited

U.S. PATENT DOCUMENTS

| 4,145,715 A | | 3/1979 | Clever |
| 4,527,151 A | | 7/1985 | Byrne |
| 4,737,847 A | * | 4/1988 | Araki et al. ................... 348/161 |
| 4,821,118 A | | 4/1989 | Lafreniere |
| 5,051,827 A | | 9/1991 | Fairhurst |
| 5,091,780 A | | 2/1992 | Pomerleau |
| 5,291,563 A | * | 3/1994 | Maeda .......................... 382/103 |
| 5,303,045 A | | 4/1994 | Richards et al. |
| 5,307,170 A | | 4/1994 | Itsumi et al. |
| 5,353,168 A | | 10/1994 | Crick |
| 5,404,170 A | | 4/1995 | Keating |
| 5,473,364 A | * | 12/1995 | Burt ................................ 348/47 |
| 5,491,511 A | | 2/1996 | Odle |

(Continued)

FOREIGN PATENT DOCUMENTS

| DE | 10358333 | 7/2005 |
| EP | 1 484 892 | 12/2004 |

(Continued)

OTHER PUBLICATIONS

Wang, J.Y.A.; Adelson, E.H., "Representing moving images with layers," Image Processing, IEEE Transactions on , vol. 3, No. 5, pp. 625-638, Sep. 1994.*

(Continued)

Primary Examiner — Dave Czekaj
Assistant Examiner — David N Werner
(74) Attorney, Agent, or Firm — Soroker-Agmon

(57) ABSTRACT

An apparatus and method for detection of abnormal motion in video stream, having a training phase for defining normal motion and a detection phase for detecting abnormal motions in the video stream is provided. Motion is detected according to motion vectors and motion features extracted from video frames.

20 Claims, 4 Drawing Sheets

(56) References Cited

U.S. PATENT DOCUMENTS

| | | |
|---|---|---|
| 5,519,446 A | 5/1996 | Lee |
| 5,734,441 A | 3/1998 | Kondo et al. |
| 5,742,349 A | 4/1998 | Choi et al. |
| 5,751,346 A | 5/1998 | Dozier et al. |
| 5,790,096 A | 8/1998 | Hill, Jr. |
| 5,796,439 A | 8/1998 | Hewett et al. |
| 5,847,755 A | 12/1998 | Wixson et al. |
| 5,895,453 A | 4/1999 | Cook |
| 5,920,338 A | 7/1999 | Katz |
| 6,014,647 A | 1/2000 | Nizzari et al. |
| 6,028,626 A | 2/2000 | Aviv |
| 6,031,573 A | 2/2000 | MacCormack et al. |
| 6,037,991 A | 3/2000 | Thro et al. |
| 6,067,367 A * | 5/2000 | Nakajima et al. ............ 382/103 |
| 6,070,142 A | 5/2000 | McDonough et al. |
| 6,081,606 A | 6/2000 | Hansen et al. |
| 6,092,197 A | 7/2000 | Coueignoux |
| 6,094,227 A | 7/2000 | Guimier |
| 6,097,429 A | 8/2000 | Seeley et al. |
| 6,111,610 A | 8/2000 | Faroudja |
| 6,128,396 A * | 10/2000 | Hasegawa et al. ............ 382/103 |
| 6,134,530 A | 10/2000 | Bunting et al. |
| 6,138,139 A | 10/2000 | Beck et al. |
| 6,167,395 A | 12/2000 | Beck et al. |
| 6,170,011 B1 | 1/2001 | Beck et al. |
| 6,212,178 B1 | 4/2001 | Beck et al. |
| 6,230,197 B1 | 5/2001 | Beck et al. |
| 6,295,367 B1 | 9/2001 | Crabtree et al. |
| 6,297,844 B1 * | 10/2001 | Schatz et al. ................... 348/43 |
| 6,327,343 B1 | 12/2001 | Epstein et al. |
| 6,330,025 B1 | 12/2001 | Arazi et al. |
| 6,345,305 B1 | 2/2002 | Beck et al. |
| 6,404,857 B1 | 6/2002 | Blair et al. |
| 6,427,137 B2 | 7/2002 | Petrushin |
| 6,441,734 B1 | 8/2002 | Gutta et al. |
| 6,549,613 B1 | 4/2003 | Dikmen |
| 6,559,769 B2 | 5/2003 | Anthony et al. |
| 6,570,608 B1 | 5/2003 | Tserng |
| 6,604,108 B1 | 8/2003 | Nitahara |
| 6,628,323 B1 * | 9/2003 | Wegmann ..................... 348/143 |
| 6,628,835 B1 | 9/2003 | Brill et al. |
| 6,704,409 B1 | 3/2004 | Dilip et al. |
| 6,731,799 B1 * | 5/2004 | Sun et al. ...................... 382/173 |
| 6,823,011 B2 * | 11/2004 | Divakaran et al. ....... 375/240.16 |
| 7,076,427 B2 | 7/2006 | Scarano et al. |
| 7,103,806 B1 | 9/2006 | Horvitz |
| 7,167,575 B1 * | 1/2007 | Nichani et al. ................ 382/103 |
| 2001/0043697 A1 | 11/2001 | Cox et al. |
| 2001/0052081 A1 | 12/2001 | McKibben et al. |
| 2002/0005898 A1 | 1/2002 | Kawada et al. |
| 2002/0010705 A1 | 1/2002 | Park et al. |
| 2002/0059283 A1 | 5/2002 | Shapiro et al. |
| 2002/0087385 A1 | 7/2002 | Vincent |
| 2003/0059016 A1 | 3/2003 | Lieberman et al. |
| 2003/0095602 A1 * | 5/2003 | Divakaran et al. ....... 375/240.16 |
| 2003/0123702 A1 * | 7/2003 | Colmenarez et al. ......... 382/103 |
| 2003/0128099 A1 | 7/2003 | Cockerham |
| 2003/0163360 A1 | 8/2003 | Galvin |
| 2003/0223619 A1 * | 12/2003 | Stocker et al. ................ 382/107 |
| 2004/0098295 A1 | 5/2004 | Sarlay et al. |
| 2004/0141508 A1 | 7/2004 | Schoeneberger et al. |
| 2004/0161133 A1 | 8/2004 | Elazar et al. |
| 2004/0249650 A1 | 12/2004 | Freedman et al. |
| 2006/0093135 A1 | 5/2006 | Fiatal et al. |
| 2011/0044533 A1 * | 2/2011 | Cobb et al. ................... 382/155 |

FOREIGN PATENT DOCUMENTS

| | | | | |
|---|---|---|---|---|
| GB | 9916430.3 | 7/1999 | | |
| WO | WO 95 29470 A | 11/1995 | | |
| WO | WO 98 01838 A | 1/1998 | | |
| WO | WO 00/73996 | 12/2000 | | |
| WO | WO 0111581 A1 * | 2/2001 | ............ | G08B 15/02 |
| WO | WO 02/37856 | 10/2002 | | |
| WO | WO 03 013113 A2 | 2/2003 | | |
| WO | WO 03/067360 A2 | 8/2003 | | |
| WO | WO 03 067884 A1 | 8/2003 | | |
| WO | WO 2004 091250 | 10/2004 | | |

OTHER PUBLICATIONS

A Data—Warehouse / OLAP Framework for Scalabl Telecommunication Tandem Traffic Analysis—Qiming Chen, Meichun Hsu, Umesh Dayal—qchen,mhsu,dayal@hpl.com.

Article SERTAINTY—Automated Quality Monitoring—SER Solutions, Inc.—21680 Ridgetop Cirlce Dulles, VA—WWW.ser.com.

Article SERTAINTY—Agent Performance Optimization—2005 SE Solutions, Inc.

Lawrence P. Mark SER—White Paper—Sertainty Quality Assurance—2003-2005 SER Solutions Inc.

Douglas A. Reynolds Robust Text Independent Speaker Identification Using Gaussian Mixture Speaker Models—IEEE TransactiOns on Speech and Audio Processing, vol. 3, No. 1, Jan. 1995.

Chaudhari, Navratil, Ramaswamy, and Maes Very Large Population Text—Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on Speech and Audio Processing, vol. 4, 31-44.

Towards an Automatic Classification of Emotions in Speech—N. Amir. S. Ron.

NiceVision—Secure your Vision, a prospect by NICE Systems, Ltd.

Freedman, I. Closing the Contact Center Quality Loop with Customer Experience Management, Customer Interaction Solutions, vol. 19, No. 9, Mar. 2001.

PR Newswire, NICE Redefines Customer Interactions with Launch of Customer Experience Management, Jun. 13, 2000.

PR Newswire, Recognition Systems and Hyperion to Provide Closed Loop CRM Analytic Applications, Nov. 17, 1999.

Financial companies want to turn regulatory burden into competitive advantage, Feb. 24, 2003, printed from InformationWeek, http://www.informationweek.com/story/IWK20030223S0002.

SEDOR—Internet pages form http://www.dallmeier-electronic.com.

Dror, Yuval, The Computer at the Other End of the Line, Feb. 17, 2000, 3 pages, Ha'aretz, Israel.

Egozy, Arie, The Camera that Never Sleeps, Nov. 10, 2002, 2 pages, Yedioth Aharonot, Israel.

NICE Systems, NICE Systems Announces New Aviation Security Initiative at AVSEC, Oct. 16, 2001, 3 pages, Atlanta, GA and Ra'anana, Israel.

Amir, N., & Ron, S., Center for Technological Education Holon, Israel, Towards and Automatic Classification of Emotions in Speech. Proceedings of the 5th International Conference of Spoken Language Processing (pp. 555-558). Sydney, Australia, 1998.

* cited by examiner

APPARATUS AND METHODS FOR THE DETECTION OF ABNORMAL MOTION IN A VIDEO STREAM

BACKGROUND OF THE INVENTION

1. Field of the Invention

The present invention relates to video surveillance systems in general, and to an apparatus and methods for the automatic real-time detection of abnormal motion in video streams, in particular.

2. Discussion of the Related Art

Video surveillance is commonly recognized as a critical security tool. Human operators provide the key for detecting security breaches by watching surveillance screens and facilitating immediate response. However, operators face an overload of information, watching multiple cameras on split screens, and since most of the time nothing happens, they often lose focus, get tired and bored. This results in operational inefficiency, often known as "the monitoring syndrome" whereby security infractions are usually detected only after they occur. Moreover, recorded video data is hard to locate and tedious to access and review, so it is seldom used.

For many transportation sites like airports, subways and highways, as well as for other facilities like large corporate buildings, financial institutes, correctional facilities and casinos where security and control plays a major role, video surveillance systems implemented by CCTV and IP cameras are a major and critical tool. A typical site can have one or more and in some cases tens, hundreds and even thousands of cameras all around, connected to the control room for monitoring and some times also for recording. The number of monitors in the control room is usually much smaller than the number of cameras, while the number of human eyes watching these monitors is smaller yet. Recent military tests have demonstrated that after approximately 12 minutes of continuous viewing of two or more sequencing monitors, an operator will miss up to 45% of scene activity, while after 22 minutes, an operator will miss up to 95% of scene activity.

When trying to investigate an event using video recordings from a specific camera and other related cameras, it is usually not practical to watch the entire recorded footage available. The ability to discriminate between normal and abnormal motion in video sequences can be a key factor for such applications. There is great need for a mechanism that can automatically alert the operator and direct his or her attention to unusual activity in one of the monitored scenes, as well as to summarize the important events in video recordings, thus dramatically shorten the investigation process.

SUMMARY OF THE PRESENT INVENTION

One aspect of the present invention regards an apparatus for the detection of abnormal motion in video stream, the video stream comprises one or more video frames, the video frames comprise one or more motion vectors, each motion vector representing the approximate common movement direction of a sub-part of a video frame. The apparatus further comprises an extraction module for extracting a motion vector from the video frame, each motion vector representing the approximate common movement direction of a sub-part of the video frame. The apparatus also comprises a comparison module for receiving one or more statistical models representing motion in the scene captured by the video frames; and detecting abnormal motion in the video frames based on the relation between the motion vector of the video frame and a statistical model.

Within the apparatus the statistical model represents normal motion at the site covered by the one or more video frames. The comparison module detects abnormal motion based on the mismatch between the one or more motion vectors of the one or more video frames and the one or more statistical model. The statistical model represents abnormal motion at the site covered by the motion vectors of the video frame. The comparison module detects abnormal motion based on the correspondence between motion vectors of the video frames and the statistical model. The statistical model can be based on one or more motion features of the one or more video frames captured in the site covered by the one or more video frame.

The comparison module extracts motion features from the motion vectors of the video frames. The motion feature can comprise any one of the following: (1) sum of absolute value of motion over the sub-parts within the video frame; (2) index of region within the video frame where the largest part of the motion takes place; (3) the largest part of the overall motion within the video frame, occurring in a region; (4) index of angle range in which the absolute sum of the motion is largest; (5) the part of the total motion occurring in said angle range out of the total motion. The motion feature can also include time dependent information extracted from two or more video frames. The motion vectors can be quantized to limit number of possible values of said motion vector's elements. The motion vectors can also be filtered to reduce errors.

The apparatus can further comprise a training module for creating one or more statistical models, based on one or more motion vectors or one or more motion feature representing motion. The training module also performs probability distribution estimation. The training module can generate one or more one-dimensional histograms representing the distribution of values of one of the motion features. The training module can alternatively generate a multi-dimensional histogram, each dimension of the multi-dimensional histogram representing the distribution of values of one of the one or more motion features. The training module can also generate a Gaussian type statistical model representing the distribution one or more motion features. The training module can employ a k-means method to generate a statistical model representing the distribution of one or more motion features. In association with the apparatus and methods, the statistical models used can alternatively be predetermined.

The apparatus can further comprise a mechanism for generating an alert when abnormal motion is detected. The alert can be any one of the following: an audio indication, a visual indication, a message to be sent to a predetermined person or system, an instruction sent to a system for performing a step associated with said alarm. The apparatus can further comprise a system maintenance and setup module for initializing the system parameters and maintaining the system.

Another aspect of the present invention, includes a video stream comprises one or more compressed video frames, the compressed video frames comprises one or more motion vector each representing the approximate common movement direction of a sub-part of said compressed video frame.

Another aspect of the present invention includes an apparatus comprising multiple instances of the apparatus and a control unit where the control unit grades the severity of abnormal motions detected by said instances and generates an alert for the most abnormal motion detected by said instances.

Yet another aspect of the present invention, shows a method for detecting abnormal motion in video stream, the video stream comprises one or more video frames; the method comprises the steps of extracting one or more motion vectors, each motion vector representing the approximate common movement of a sub-part of the one or more video frame; comparing the one or more motion vectors of the video frames to one or more statistical models, each statistical model representing motion in the site depicted by the video stream. The method can further comprise the step of detecting the mismatch between the statistical model and the one or more motion vectors of the one or more video frame. The method can further comprise the step of detecting the correspondence between the statistical model and the one or more motion vector of the one or more video frame. The method can also comprise the steps of extracting one or more motion feature of one or more video frame; and comparing motion features of the statistical model to the motion features of the video frames.

The statistical model can represent normal or abnormal motion in the site depicted by the video stream. The statistical model can be based on one or more motion features of the video frames in the site covered or shown by the video frames. The method can further comprise the step of training for creating the statistical models, based on a video stream representing motion at the scene covered by video frames, the method can comprise the steps of calculating the motion features for each video frame; and building the statistical model based on the motion features of the frames. The training module performs probability distribution estimation. The training module generates one-dimensional histograms representing the distribution of values of the motion features. The training module also generates a multi-dimensional histogram, each dimension of the multi-dimensional histogram representing the distribution of values of the motion features. The training module also generates a Gaussian type statistical model representing the distribution of the motion features. The training module generates a k-means statistical model representing the distribution of the motion features. The method further comprises the step of generating an alert when abnormal motion is detected.

Yet another aspect of the present invention includes a method of grading the severity of abnormal motion detected in at least two video streams by the methods described above. The method also comprising the step of generating an alert for the most severe abnormal motion.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Definitions

Figure 1:
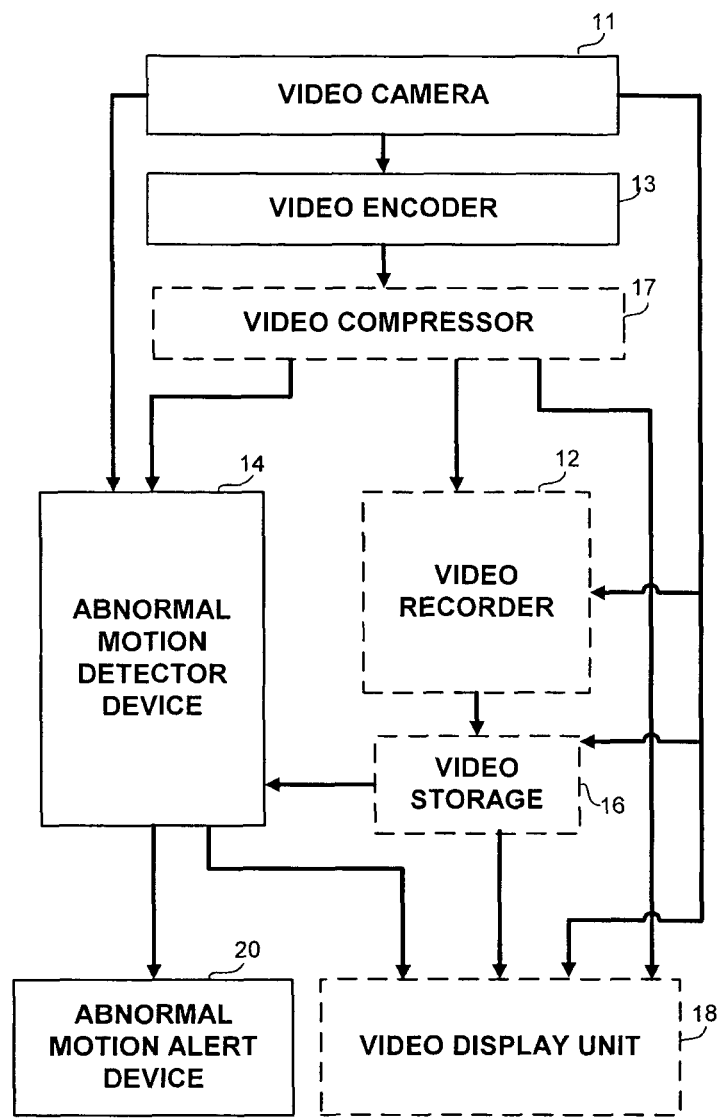
FIG. 1 is a schematic block diagram of the proposed apparatus, in accordance with the preferred embodiments of the present invention.

Normal motion—a motion which was viewed during a predetermined length of time and was confirmed by an operator, or predefined as normal. Such motion is commonly expected or acceptable at the site covered by the system of the present invention, at the relevant time.

Abnormal motion—any motion that is not a normal motion. Such motion is commonly irregular or unexpected at the site covered by the system of the present invention.

Alert—any kind of drawing attention to an abnormal motion, be it an audio indication, a visual indication, a message to be sent to a predetermined person or system, or an instruction sent to a system for performing a step associated with said alarm.

Sub-part—a fraction of a video frame, consisting of at least two adjacent pixels. In the preferred embodiment of this invention, the frame is divided into 16*16 pixel sub-parts, also referred to as macro blocks. Therefore each sub-part can be characterized by its indices in the x and y dimensions.

Motion vector—a two dimensional vector (x, y) indicating the approximate movement of a macro block between temporally close video frames.

Feature—a value generated by applying mathematical operations to the motion vectors associated with one or more macro blocks within one or more frames. The resulting number describes a certain aspect of the motion in the one or more frames. Feature can also be referred to as motion features.

Statistical model of motion—a representation of the probability distribution of the values associated with the motion in the frames introduced to the system.

An apparatus and methods for the detection of abnormal motion within a video stream are disclosed. The apparatus and methods can be employed in a real time or off line environment. Usage of the proposed apparatus and methods eliminates the need for segmentation and for tracking distinct objects. The proposed apparatus and methods utilize motion vectors for analyzing motion patterns in a monitored scene. The motion vectors are analyzed statistically in order to detect abnormal motion in a single frame or through indications from a number of frames.

The presented apparatus and methods use statistical models of normal and/or abnormal motions in the monitored scene created during a training phase, and examine the input video stream against the statistical models in order to detect abnormal motion in a detection phase. The apparatus uses a training module that creates statistical models of input streams, either in real-time or off-line. Time dependent statistical models are used since normal motion can be defined differently for different situations. For example, normal motions in a corporate lobby are completely different during day and night. Once abnormal motion has been detected, it is up to the user of the apparatus to determine how to express the alert, for example generate audio, video or any other indication. Further, since the apparatus generates a quantitative indication for the abnormality of the motion in a scene, an operative system can employ a number of instances of the above apparatus, and a controller that ranks the indications and generates alert only for the most significant instances.

Motion vector fields describing motions of macro-blocks are an integral part of current video compression standards. However, the apparatus can work as well with non-compressed video streams by calculating the motion vectors on the fly.

Referring now to FIG. 1 that shows an exemplary environment in which the proposed apparatus and associated methods are implemented. In the present non-limiting example, the environment is a security-wise sensitive location, such as a bank, an airport, or the like, that is monitored by a multi-camera system. In the framework of this exemplary surveillance system, the location includes a video camera 11, a video encoder 13, an abnormal motion detector device 14, and an abnormal motion alert device 20. Persons skilled in the art will appreciate that environments having a single or a few cameras can be used in association with the teaching of the present invention in the manner described below. One non-limiting example is a kindergarten or a home where a single camera is strategically located to monitor an area of interest. Optionally, the environment includes one or more of the following: a video compressor device 17, a video recorder device 12, a video storage device 16, and a video display unit 18. The video camera 11 is an image-acquiring device, capturing sequences of temporally consecutive snap shots of the environment. The camera 11 relays the sequence of captured frames to a video encoder unit 13. The unit 13 includes a video codec. The function of the device 13 is to encode the visual images into a set of digital signals. The signals are optionally transferred to a video compressor 17, that compresses the digital signals in accordance with now known or later developed compression protocols, such as H261, H263, MPEG1, MPEG2, MPEG4, or the like, into a compressed video stream. The encoder 13 and compressor 17 can be integral parts of the camera 11 or external to the camera 11. The codec device 13 or the compressor device 17, if present, transmit the encoded and optionally compressed video stream to the video display unit 18. The unit 18 is preferably a video monitor. The unit 18 utilizes a video codec installed therein that decompresses and decodes the video frames. Optionally, in a parallel manner, the codec device 13 or the compressor device 17 transmits the encoded and compressed video frames to a video recorder device 12. Optionally, the recorder device 12 stores the video frames into a video storage unit 16 for subsequent retrieval and replay. The storage unit 16 can be a magnetic tape, a magnetic disc, an optical disc, a laser disc, a mass-storage device, or the like. In parallel to the transmission of the encoded and compressed video frames to the video display unit 18 and the video recorder device 12, the codec device 13 or the compressor unit 17 further relays the video frames to the abnormal motion detector device 14. Optionally, the abnormal motion detector device 14 can obtain the video stream from the video storage device 16 or from any other source, such as a remote source, a remote or local network, a satellite, a floppy disc, a removable device and the like. The abnormal motion detector device 14 is preferably a computing platform, such as a personal computer, a mainframe computer, or any other type of computing platform that is provisioned with a memory device (not shown), a CPU or microprocessor device, and several I/O ports (not shown). Alternatively, the device 14 can be a DSP chip, an ASIC device storing the commands and data necessary to execute the methods of the present invention, or the like. Abnormal motion detector device 14 can further include a storage device (not shown), storing the abnormal motion detection (AMD) application. The AMD application is a set of logically inter-related computer programs and associated data structures that interact to detect abnormal or unusual motion patterns in one or more video frames. The encoded and optionally compressed video frames are received by the device 14 via a pre-defined I/O port and are processed by the AMD application. The results of the processing are indications of statistical nature concerning the presence or absence of abnormal motion in one or more video frames. In accordance with the results of the processing, the device 14 generates an alert indicator signal and relays the signal to the abnormal alert device 20. Device 20 can generate an audio indication, a visual indication, a message to be sent to a predetermined person or system, local or remote, for performing a step associated with said alarm or any other alert. The alert can also draw the attention of a human operator to examine more closely the images displayed on the display unit 18, if present.

Note should be taken that although the drawing under discussion shows a single video camera, and a set of single devices, it would be readily perceived that in a realistic environment a multitude of cameras could send a plurality of video streams to a plurality of video display units, video recorders, and abnormal motion detector devices. In such environment there can optionally be a grading unit (not shown here) that grades the outputs of the abnormal motion detector devices and generates alerts only for the n most disturbing motions, n being the number of alerts the system of the present invention is capable of handling.

Further note should be taken that the apparatus presented is exemplary only. In other preferred embodiments of the present invention, the AMD application, the video storage, video recorder device or the abnormal motion alert device could be co-located on the same computing platform. In yet further embodiments of the present invention, a multiplexing device could be added in order to multiplex several video streams from several cameras into a single multiplexed video stream. The abnormal motion detector device 14 could optionally include a de-multiplexer unit in order to separate the combined video stream prior to the suitable processing in order to provide camera identification in the alert.

Figure 2:
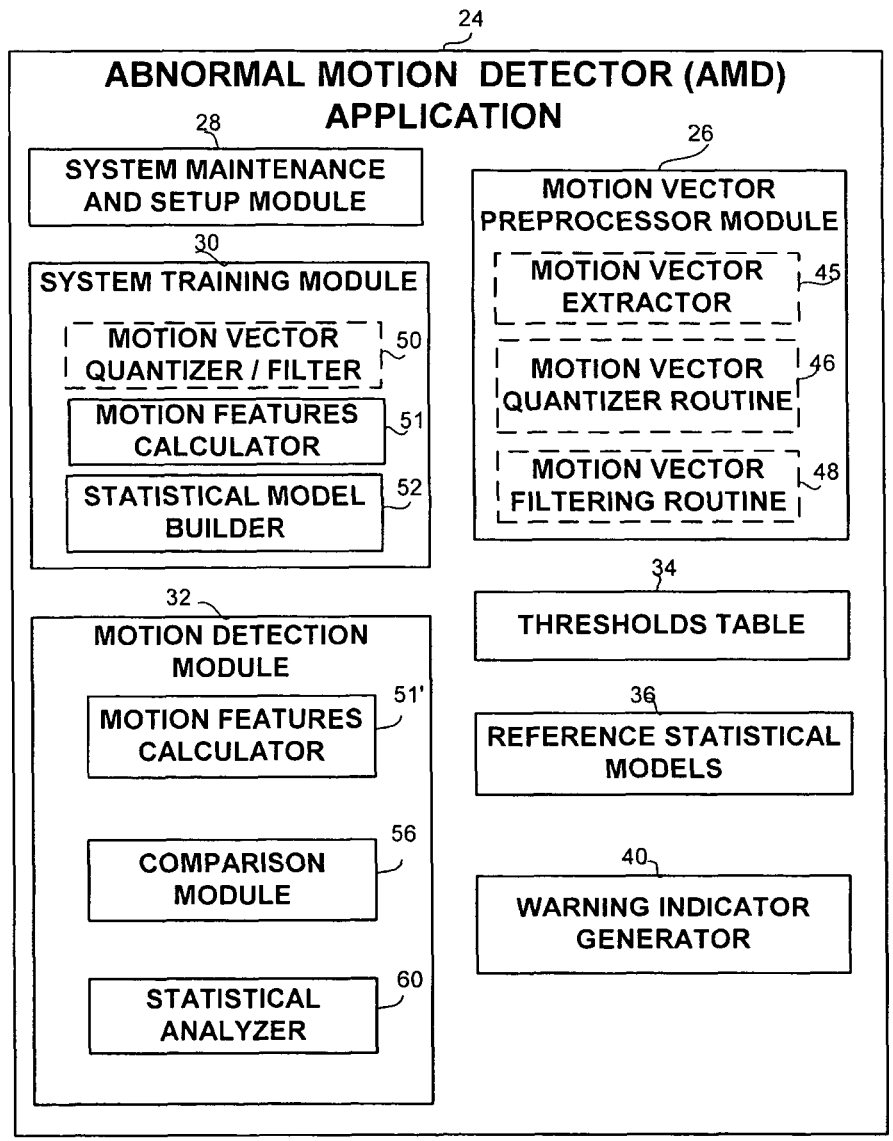
FIG. 2 is a schematic block diagram of the operating components of the abnormal motion detection application, in accordance with the preferred embodiments of the present invention.

Referring now to FIG. 2, the abnormal motion detector (AMD) application 24 is a set of logically inter-related computer programs and associated data structures operating within the devices shown in association with FIG. 1. In the preferred embodiments of the present invention, the AMD application 24 resides on a storage device of the abnormal motion detector (AMD) device 14 of FIG. 1. The AMD device 14 loads the AMD application 24 from the storage device into the processor and executes the AMD application 24. Application 24 includes a system maintenance and setup module 28, a motion vector preprocessor module 26, a system training module 30, a motion detection module 32, a thresholds table 34, reference statistical models 36, and a warning indicator generator 40. System maintenance and setup module 28 is utilized for setting up of the parameters of the system, such as pre-defined threshold values and the like, and for routine maintenance purposes, such as backup operations and the like.

Still referring to FIG. 2, motion vector preprocessor module 26 includes a motion vector extractor 45, a motion quantizer routine 46, and a motion vector filtering routine 48. The motion vector extractor 45 is necessary only when the input stream is not compressed and does not contain motion vectors, or when a frame or a group of frames within the video stream does not include motion vectors.

The motion vector quantizer routine 46 is used optionally to reduce the dynamic range of the motion vectors, and consequently the memory consumption and the training period required for certain statistical models. The motion vector quantizer routine 46 maps the possible values of the motion vector's elements into a small discrete set of values.

The motion vector filtering routine 48 is used optionally, and is designed to handle the possible difference between the motion vector chosen by the video compressor to optimally describe the movement of a macro block, and the real movement of that macro block. This problem is common in smooth image regions, where many blocks are similar to each other, and especially when strong camera noise (dark areas) exists. A motion vector may also be wrong at diagonal edges of moving objects, where an object that was moving horizontally, is interpreted as moving diagonally. The wrong motion vector in these cases will be usually perpendicular to the edge. This optional filtering routine will apply a spike reducing or smoothing or outlier removal filters.

Still referring to FIG. 2, system training module 30 performs the training process. The training process is performed either offline or online, prior to the motion detection process. System training module 30 optionally includes a motion vector quantizer and filter routine 50, a motion features calculator 51, and a reference statistical model builder 52. Motion vector quantizer and filter 50 is similar to motion vector quantizer 46 and motion vector filtering routine 48 described above. Motion features calculator 51 calculates specific features that represent certain aspects of the collection of the motion vectors associated with a specific frame, or collection of frames. Reference statistical model builder 52 generates a reference statistical model during the training phase to be used as a data structure representing motions to be compared to, during the detection phase.

Motion detection module 32 performs the detection of abnormal motion in the compressed video. Module 32 includes a motion features calculator 51', a comparison module 56 and a statistical analyzer 60.

In the first preferred embodiment of the present invention, the motion features calculators 51 and 51', preferably generate five motion features from the motion vectors obtained from the video stream. In accordance with the preferred embodiment of the present invention, the motion features can be calculated according to the following example.

The typical image resolution used in video for surveillance is CIF (i.e. 352×288 pixels). In the context of the present invention, each frame f is divided into sub-parts, being macro blocks of 16×16 pixels, thus each frame contains 396 motion vectors having two components each. From these 792 components a much smaller number of features are extracted. For each typical sub-part i, $V_i=(Vx_i, Vy_i)$ is the motion vector associated with the motion of this sub-part in a specific frame f. In addition, frame f is divided into a predetermined number n of equally-sized regions $\{A_n\}$. In the context of the present invention regions are preferably larger than sub-parts. The following motion features are used:

$$m_1 = V = \sum_i |V_i| \qquad (1)$$

This feature is referred to as motion sum. The motion sum feature integrates the absolute values of the motion vectors in the entire frame. This feature can be described as the total absolute motion in the frame.

(2) $m_2$ is a feature referred to as motion region.
The motion region is the index of the region (one of $\{A_n\}$) of the frame f with the largest sum of absolute values of motion vectors. This feature is the part of frame f where the largest motion takes place.

$$m_3 = \max_n \frac{\sum_{i \in An} |V_i|}{V + \varepsilon} \qquad (3)$$

This feature is referred to as motion density. The motion density feature represents the ratio between the sums of the absolute values of the motion vectors in region $m_2$ and the total absolute motion in frame f, $m_1$. The motion density feature measures the concentration of motion within a particular region. A small positive predetermined constant $\varepsilon$ is added to the denominator to avoid division by 0 in static frames.

(4) $m_4$ is a feature referred to as motion direction.
The 360° range is divided into a predetermined number of equally-sized ranges (for example, eight ranges of 45° each and the like). The motion direction feature is the index of the angle range in which the absolute sum of the motion vectors is the largest within the equally-sized ranges. The motion direction is the dominant motion direction in frame f.

(5) $m_5$ is a feature referred to as direction density. The direction density feature represents the ratio between the sum of the absolute motion value in the direction $m_4$ and the sum of the absolute motion in the entire frame f. The direction density represents the dominance of the most common motion direction with respect to other motion directions in the frame f.

The five exemplary features described above are non-limiting, and can also be calculated or arrived at in other manners. Persons skilled in the art will readily perceive that fewer, additional, or different features can be employed as well in the context of the present invention.

Still referring to FIG. 2, the thresholds table 34 is a data structure that stores pre-defined threshold values used during the motion detection phase. The reference statistical models 36 are data structures that store the statistical models generated during the learning phase. In the first preferred embodiment of this invention, this model is, for example, a 5-dimensional histogram in which each entry represents the likelihood of the combination of the relevant values of the five features. Another possibility is a Gaussian mixture model (GMM), representing concentrations of combinations of the five feature values that are likely to occur. In the second preferred embodiment of this invention, we do not extract features, but rather work on the motion vectors directly. The data structure for the second preferred embodiment is a statistical model, such as a two dimensional histogram or a GMM representing the distribution of the motion vectors themselves and the like.

The warning indicator generator module 40 is responsible for the generation of warning indicators following abnormal motion detection and in the relaying of the indicators to the suitable warning devices.

Still referring to FIG. 2, the present invention proposes two preferred methods for detecting abnormal activity by utilizing motion vectors from compressed video stream. Each of the methods is associated with a preferred embodiment of the present invention. The operational principle of the first embodiment is based on statistical analysis of motion features, calculated from motion vectors as described herein above. The second preferred embodiment involves a second method that operates directly on the motion vectors by performing local statistical analysis on each motion vector. The two methods associated with the two preferred embodiments respectively, include a training phase and a detection phase. In the training phase, both methods build a statistical model of the activity in the scene. In the detection phase the first and second methods compare the motion data, in a temporal moving window (a few frames), to the statistical model. Abnormal activity is then detected when there is significant incompatibility to a statistical model of usual activity, or significant compatibility to an unusual or prohibited activity (such as when a motion in a particular direction is detected in an area where such motion is unexpected). Both methods can use the quantized and filtered motion vectors as described herein above, but they can also avoid using them, depending on the employed statistical models.

Figure 3:
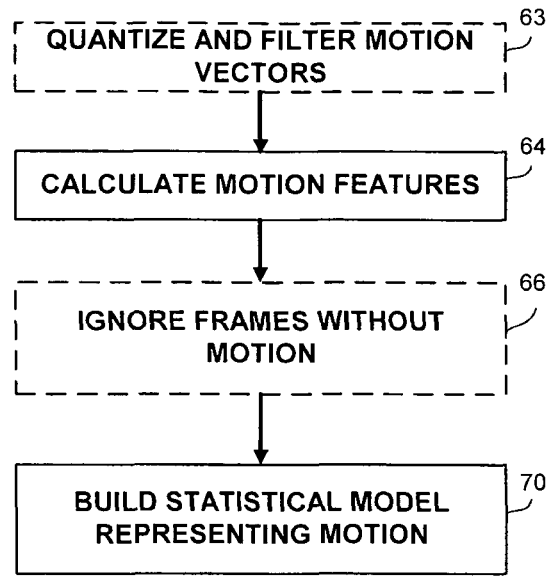
FIG. 3 is a flow chart describing the operational steps relating to the training phase of the method used in the first preferred embodiment of the present invention.

Referring now to FIG. 3, the first preferred embodiment of the present invention utilizes a method of operation referred to generally as the joint probability of motion features. Optionally, at step 63, the motion vectors received from the video stream analyzed, are quantized or filtered. At step 64 the five motion features discussed in association with FIG. 2 are calculated for each video frame. In step 66, frames without motion are optionally ignored in order not to obscure other values in the statistical models. Such frames can optionally be ignored because many monitored scenes are usually static. A statistical model that takes into account the five features is constructed in step 70. In other embodiments, additional models can be constructed in step 70. Preferred examples of statistical models can be a GMM, a model representing the result of a k-means algorithm, a five-dimensional histogram and the like.

The model built herein above represents the probability distribution of the exemplary five dimensional vectors. Usual motions, repeated often, are transformed to identical or similar five-dimensional vectors, therefore the relevant neighborhoods in the five dimensional feature space are assigned high probability, while abnormal or seldom-occurring combinations of motion features are assigned low probability.

Figure 4:
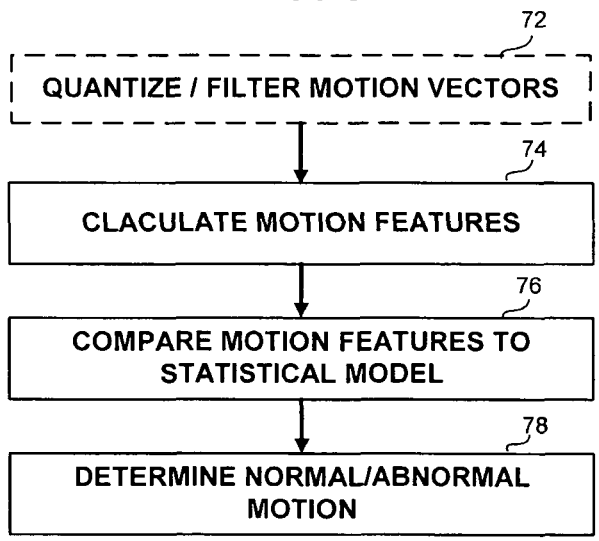
FIG. 4 is a flow chart describing the operational steps relating to the detection phase of the method used in the first preferred embodiment of the present invention.

Referring now to FIG. 4, describing the detection method in the first preferred embodiment. The first method optionally quantizes and filters the motion vectors in step 72, then the five motion features are calculated for every frame in step 74 in the same manner performed during the training phase shown in step 64 of FIG. 3. The five features are treated as a 5-dimensional vector. The probability assigned to the five dimensional vector in the statistical model built in the training phase, is then compared to a predetermined threshold in step 76 providing an indication if the examined vector of motion features is of low probability and therefore suspect as representing abnormal activity. In step 78 the indication received in step 76 is further examined in light of the indications generated in step 76 for the frames that are temporally close to the analyzed frame (a few frames preceding and following the current one or as predetermined by the user of the apparatus of the present invention). Step 78 is preferably a temporal filter, designed in order to smooth short spikes detected that are not due to meaningful abnormal motion, as well as to disregard short breaks during abnormal activity.

Once abnormal activity is detected an alarm is generated. The alarm can include any visual or audio alert, as well as sending a message to a device or person, located locally or remotely. Alternatively, the alert comprises the generation of a log or other data entry on a data storage device associated with the system of the present invention.

Figure 5:
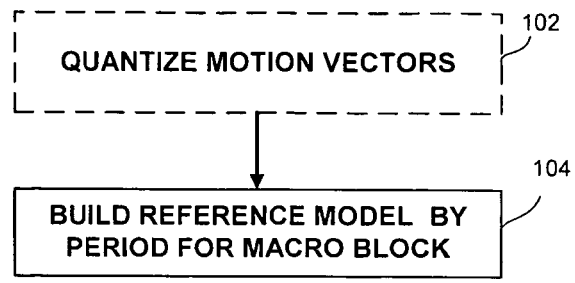
FIG. 5 is a flow chart describing the operational steps relating to the training phase of the method used in the second preferred embodiment of the present invention.

Referring now to FIG. 5, the second preferred embodiment of the present invention utilizes a second method of operation generally referred to as the local distributions of motion vectors. This method operates directly on the (optionally) quantized and filtered motion vectors rather than on calculated motion features. Thus, the second method comprises the ability to locate the activity within the scene. The method uses a temporal filter (not shown) in order to suppress motion vectors spikes and short interrupts during abnormal activity. During the operation of the training block, for each video frame the motion vectors are optionally quantized at step 102. The quantization is performed per each motion vector component, i.e., separately for Vx and Vy. Preferably, each component can have seven different values (static, three positive values corresponding to slow medium and fast motion and three similar negative values). Thus the quantized motion vector V=(Vx,Vy) can have 49 different values. A histogram or any other statistical model is built per macro block, containing probability information for each value of motion vector (step 104). In a one non-limiting example of a histogram model representation, let (i,j) be the indices of a macro block which has for frame f the motion vector $V_{i,j}=(Vx_{i,j},Vy_{i,j})$ and quantized and filtered vector $\nabla_{i,j}=(\nabla x_{i,j},\nabla y_{i,j})$. $H_{i,j}$ is the histogram corresponding to macro block (i,j), which is a 7×7 matrix. H is the matrix built from all $H_{i,j}$ histograms.

$$H = \begin{bmatrix} H_{1,1} & H_{1,2} & \cdots & H_{1,J} \\ H_{2,1} & H_{2,2} & \cdots & H_{2,J} \\ \vdots & \vdots & \ddots & \vdots \\ H_{I,1} & H_{I,2} & \cdots & H_{I,J} \end{bmatrix}$$

In this example, at the start of the operation of the training phase, the $H_{i,j}$ matrix is initialized to zero. During the operation of the training block, the method increments for each frame f and for each macro block (i,j) of that frame, the cell ($\nabla x_{i,j},\nabla y_{i,j}$) of matrix $H_{i,j}$ in block matrix H. At the termination of the operation of the training block, each matrix $H_{i,j}$ is normalized by itself, while ignoring the value of "no motion".

Figure 6:
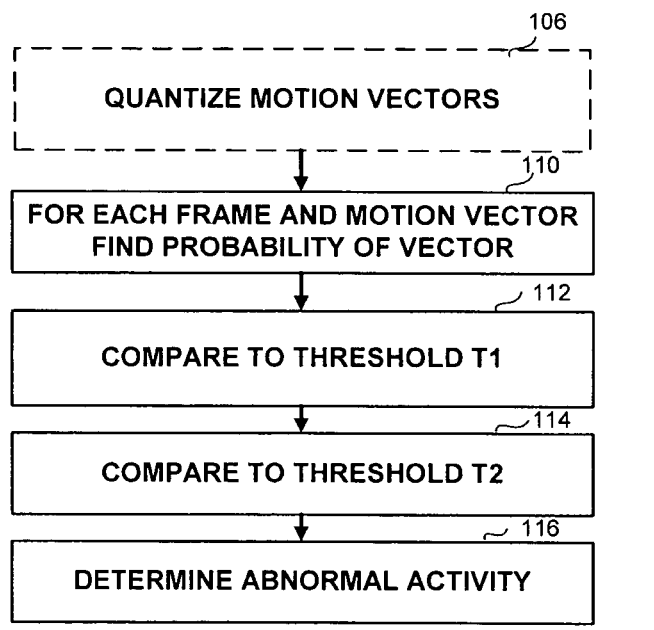
FIG. 6 is a flow chart describing the operational steps relating to the detection phase of the method used in the second preferred embodiment of the present invention.
Figure 6:

Referring now to FIG. 6, during the operation of the motion detection phase, for each frame f and for each macro block (i,j) the method optionally quantizes or filters the motion vector in step 106. Then the empirical probability of the quantized and filtered vector ($\nabla x_{i,j},\nabla y_{i,j}$) in $H_{i,j}$ is examined (step 110) and compared to a predetermined threshold $T_1$ (step 112). If the probability is below the predetermined threshold $T_1$, the macro block will be considered as suspicious. Subsequently, the method compares the number of suspicious macro blocks per a temporal moving window of frames, to a second threshold $T_2$ at step 114. If there are more macro blocks than the predetermined threshold $T_2$, then a positive decision is made concerning the presence of abnormal activity at step 116.

In the second preferred embodiment of the invention, a simple minimum time between events rule is used to avoid multiple detections per event. In other preferred embodiments further temporal segmentation could be performed in order to distinguish between different actions.

During the operation of the spatial localization block 118 the spatial location of the event is found by calculating the average position of the macro blocks whose motion vector's value in their histogram is less then $T_1$, i.e., that are less probable.

The above shown examples serve merely to provide a clear understanding of the invention and not to limit the scope of the present invention or the claims appended thereto. Persons skilled in the art will appreciate that other features or statistical models can be used in association with the present invention so as to meet the invention's goals.

The proposed apparatus and methods are innovative in terms of using compressed video domain for the task of detecting abnormal motion. The apparatus and methods of the present invention do not necessitate processing to be performed on the picture or image layer or providing an event model. However, the apparatus and methods of the present invention may be operated in conjunction with the processing of images, or the providing of an event model, or the like. The proposed methods are adaptive to any scene through the learning of the normal or abnormal motion statistics thereof. The proposed methods require minimal processing power, as no object segmentation or object tracking is involved. Therefore, the proposed apparatus and methods are optimally suitable for real-time multi-camera surveillance or observation systems operating in many environments. Persons skilled in the art will appreciate that the present invention can also be applied to single camera systems and to any video system capturing a sequence of events. Such applications are not limited to the security field, but can also apply to a myriad of other fields, including video processing in general and others.

As was described in detail herein above, the present invention proposes two different methods for detecting abnormal motion in compressed video. Both methods are based on the concept of using motion vectors of the compressed video and performing a training phase to build a statistical model of normal motion in the scene. In the detection phase the statistical model is used to classify motion in a frame or a group of frames into normal or abnormal.

It is important to note that multiple training sessions can be held, generating models of normal motions and models of abnormal motions. In addition to the above description of comparing motions to models of normal motions, the motion within the site can be compared also to a model representing abnormal motion, and an alert would be generated if the motion is significantly similar to the trained abnormal motion.

Both preferred methods detailed above consume minimal processing power, because the actual images are not processed, rather meta-data of motion (motion vectors), which comprises 256 times less data to handle (assuming 16×16 sub-parts are used). The processing requirements of the first preferred method are low since only the extraction of motion features out of the motion vectors and comparison to an existing model are required. The processing requirements of the second preferred method are also low, since only a single look-up table per macro block per frame is required.

Since the operational principles of the first and second preferred methods are different, it would be obvious to those skilled in the art that by combining the preferred methods, more efficient performance of the system described above could be obtained. By using a logical operation such as OR or the like on the decision values produced by the preferred methods, additional events could be detected without significant increase in the number of false alarms, or processing power.

The apparatus is not limited to using statistical models created with the training module, but can rather utilize various models generated or acquired in any other manner.

It will be appreciated by persons skilled in the art that the present invention is not limited to what has been particularly shown and described hereinabove. Rather the scope of the present invention is defined only by the claims which follow.

What is claimed is:

1. An apparatus for detection of abnormal activity in a video stream, the video stream having video frames, the apparatus comprising:
    a system maintenance and setup module;
    a module that extracts motion vectors, from each of the video frames, that represent an approximate common movement direction of a predetermined sub-part of each of said frames;
    a system training module that creates at least one statistical model representing usual activity based on said motion vectors or on at least one motion feature generated from said motion vectors; and
    a motion detection module that detects abnormal activity by determining according to the at least one statistical model, that a probability of at least one motion vector of said motion vectors associated with said predetermined sub-part or said at least one motion feature extracted from the at least one motion vector associated with said predetermined sub-part, is below a predetermined threshold when compared to the said at least one statistical model,
    wherein said predetermined sub-part is a macro-block; and
    wherein the at least one statistical model is represented as a one-dimensional histogram representing the distribution of values of one of the at least one motion feature.

2. The apparatus of claim 1, wherein the at least one motion feature comprises any one of the following:
    sum of absolute value of motion over the sub-parts within the at least one video frame;
    index of region within the at least one video frame where the largest part of the motion takes place;
    the largest part of the overall motion within the at least one video frame, occurring in a region;
    index of an angle range in which the absolute sum of the motion is largest; or
    the part of the total motion occurring in said angle range out of the total motion.

3. The apparatus of claim 1 wherein the at least one motion vector is filtered, by applying a filter selected from the group consisting of: (a) a spike reducing filter, (b) a smoothing filter, and (c) an outlier removal filter, to reduce errors.

4. The apparatus of claim 1 further comprising an abnormal motion alert device for generating an alert when an abnormal motion is detected.

5. The apparatus of claim 4 wherein the alert is any one of the following: an audio indication, a visual indication, a message to be sent to a predetermined person or system, an instruction sent to a system for performing a step associated with said alarm.

6. An apparatus comprising at least two instances of the apparatus of claim 1; and a grading unit for grading the severity of abnormal motions detected by the at least two instances of the apparatus of claim 1 and for generating an alert for the at least one most abnormal motion detected by the at least two instances.

7. The apparatus of claim 6 wherein the alert is any one of the following: an audio indication, a visual indication, a message to be sent to a predetermined person or system, an instruction sent to a system for performing a step associated with said alarm.

8. The apparatus of claim 1 further comprising:
    at least one statistical model representing abnormal motion, and wherein:
        the motion detection module compares at least one motion vector associated with the motion, or at least one motion feature extracted from the at least one motion vector associated with the motion, to the at least one statistical model representing abnormal motion.

9. An apparatus for detection of abnormal activity in a video stream, the video stream having video frames, the apparatus comprising:

a system maintenance and setup module;
a module that extracts motion vectors, from each of the video frames, that represent an approximate common movement direction of a predetermined sub-part of each of said frames;
a system training module that creates at least one statistical model representing usual activity based on said motion vectors or on at least one motion feature generated from said motion vectors; and
a motion detection module that detects abnormal activity by determining according to the at least one statistical model, that a probability of at least one motion vector of said motion vectors associated with said predetermined sub-part or said at least one motion feature extracted from the at least one motion vector associated with said predetermined sub-part, is below a predetermined threshold when compared to the said at least one statistical model,
wherein said predetermined sub-part is a macro-block; and
wherein the at least one statistical model is represented as a multi-dimensional histogram, wherein each dimension of the multi-dimensional histogram represents a distribution of values of one of the at least one motion feature.

10. An apparatus for detection of abnormal activity in a video stream, the video stream having video frames, the apparatus comprising:
a system maintenance and setup module;
a module that extracts motion vectors, from each of the video frames, that represent an approximate common movement direction of a predetermined sub-part of each of said frames;
a system training module that creates at least one statistical model representing usual activity based on said motion vectors or on at least one motion feature generated from said motion vectors; and
a motion detection module that detects abnormal activity by determining according to the at least one statistical model, that a probability of at least one motion vector of said motion vectors associated with said predetermined sub-part or said at least one motion feature extracted from the at least one motion vector associated with said predetermined sub-part, is below a predetermined threshold when compared to the said at least one statistical model,
wherein said predetermined sub-part is a macro-block; and
wherein the statistical model representing the distribution of an at least one motion feature is created using a k-means method.

11. A method for detection of abnormal activity in a video stream, the video stream having video frames, the method comprising:
capturing frames with a video camera;
extracting motion vectors, from each of the frames, that represent an approximate common movement direction of a predetermined sub-part of said frames;
creating at least one statistical model, representing usual activity, based on said motion vectors, or on an at least one motion feature generated from said motion vectors;
detecting abnormal activity by determining according to the at least one statistical model that a probability of at least one motion vector associated with the said predetermined sub-part or at least one motion feature extracted from the at least one motion vector associated with said predetermined sub-part, is below a predetermined threshold; and
relaying a warning indication for the abnormal activity to a warning device,
wherein the sub-part is a macro-block; and
wherein the at least one statistical model is a one-dimensional histogram representing the distribution of values of the at least one motion feature.

12. The method of claim 11 wherein the at least one motion feature comprises any of the following:
sum of absolute value of motion over all macro blocks;
index of region within the at least one video frame where the largest part of the motion takes place;
the largest part of the overall motion within the at least one video frame, occurring in a specific region;
index of an angle range in which the absolute sum of the motion is largest;
the part of the total motion occurring in said angle range out of the total motion.

13. The method of claim 11 further comprising:
applying a filter to at least one motion vector to reduce errors,
wherein said filter is selected from the group consisting of: (a) a spike reducing filter, (b) a smoothing filter, and (c) an outlier removal filter.

14. The method of claim 11 further comprising an abnormal activity alert generation step of generating an alert when abnormal activity is detected.

15. The method of claim 14 wherein the alert is any one of the following: an audio indication, a visual indication, a message to be sent to a predetermined person or system, an instruction sent to a system for performing a step associated with said alarm.

16. The method of claim 11 further comprising a step of grading the severity of abnormal activities detected in at least two video streams.

17. The method of claim 16 further comprising a step of generating an alert for an abnormal activity that is a most severe abnormal activity among the abnormal activities detected in the at least two video streams.

18. The method of claim 11 wherein the statistical model represents abnormal motion and wherein said step of determining if a motion is normal or abnormal compares at least one motion feature, extracted from the motion vectors associated with the motion, to the at least one statistical model representing abnormal motion.

19. A method for detection of abnormal activity in a video stream, the video stream having video frames, the method comprising:
capturing frames with a video camera;
extracting motion vectors, from each of the frames, that represent an approximate common movement direction of a predetermined sub-part of said frames;
creating at least one statistical model, representing usual activity, based on said motion vectors, or on an at least one motion feature generated from said motion vectors;
detecting abnormal activity by determining according to the at least one statistical model that a probability of at least one motion vector associated with the said predetermined sub-part or at least one motion feature extracted from the at least one motion vector associated with said predetermined sub-part, is below a predetermined threshold; and
relaying a warning indication for the abnormal activity to a warning device,
wherein the sub-part is a macro-block; and
wherein the at least one statistical model is a multi-dimensional histogram, wherein each dimension of the multi-dimensional histogram represents a distribution of values of one of the at least one motion feature.

20. A method for detection of abnormal activity in a video stream, the video stream having video frames, the method comprising:
- capturing frames with a video camera;
- extracting motion vectors, from each of the frames, that represent an approximate common movement direction of a predetermined sub-part of said frames;
- creating at least one statistical model, representing usual activity, based on said motion vectors, or on an at least one motion feature generated from said motion vectors;
- detecting abnormal activity by determining according to the at least one statistical model that a probability of at least one motion vector associated with the said predetermined sub-part or at least one motion feature extracted from the at least one motion vector associated with said predetermined sub-part, is below a predetermined threshold; and
- relaying a warning indication for the abnormal activity to a warning device,
- wherein the sub-part is a macro-block; and wherein the statistical model representing the distribution of an at least one motion feature is created using a k-means method.

\* \* \* \* \*